3,101,338
HYDROXYDIALKYLAMINOALKYLAMINOISO-QUINOLINES AND RELATED COMPOUNDS

Richard A. Robinson, Evanston, Ill., assignor to G. D. Searle & Co., Chicago, Ill., a corporation of Delaware
No Drawing. Filed Sept. 6, 1962, Ser. No. 221,896
12 Claims. (Cl. 260—268)

The present invention relates to a group of hydroxy-substituted dialkylaminoalkylaminoisoquinolines and hydroxy-substituted (cyclic amino)alkylaminoisoquinolines. More particularly the present invention relates to compounds having the following formula $$Q-NH-Alk-NRR'$$

wherein Q is selected from the group consisting of isoquinolyl, 5-methoxy-1-isoquinolyl, and 7-chloro-1-isoquinolyl; Alk is lower alkylene containing 2 to 5 carbon atoms; —NRR' is selected from the group consisting of (lower alkyl)(hydroxy lower alkyl)amino, piperidine or pyrrolidine substituted with a hydroxy or a hydroxy lower alkyl group, and hydroxy(lower alkyl)piperazinyl. More particularly, —NRR' can have the following values:

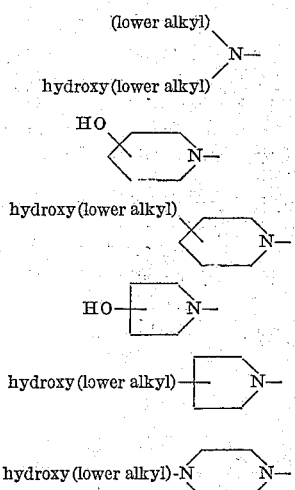

and

The lower alkyl radicals referred to above contain up to 6 carbon atoms and are exemplified by radicals such as methyl, ethyl, propyl, isopropyl, and butyl. Likewise, the hydroxy(lower alkyl) radicals referred to above contain up to 6 carbon atoms and are exemplified by radicals such as hydroxymethyl, 2-hydroxyethyl, 3-hydroxypropyl, and 2-hydroxypropyl. Alk in the above formula separates the nitrogen atoms by at least 2 carbon atoms and thus is exemplified by ethylene, trimethylene, propylene, tetramethylene, 1,2-butylene, and pentamethylene.

Halogen or hydroxy substituted isoquinolines can serve as the starting materials for preparing the compounds of the present invention. In particular, the 1-substituted isoquinolines of the present invention can be prepared by reacting a 1-haloisoquinoline, preferably 1-chloroisoquinoline, with an amine of the formula $$H_2N-Alk-NRR'$$

wherein Alk and —NRR' have the values indicated above. If a polyhalogenated isoquinoline such as 1,7-dichloroisoquinoline is reacted with an amine, the corresponding 1-aminoisoquinoline is obtained.

Those compounds wherein the amino group is located at positions other than the 1-position of the isoquinoline nucleus can be prepared by reacting the appropriate amine with an appropriate hydroxyisoquinoline and sulfur dioxide or a sulfite, such as ammonium sulfite and sodium bisulfite, in a Bucherer type reaction. The reaction is carried out at a temperature of about 100–200° C.

The compounds of this invention posses valuable pharmacological properties. Thus, they possess useful anti-inflammatory activity as is demonstrated by their phenyl-butazone-like effect on edematous conditions and their low toxicity.

The present compounds also are inhibitors of seed germination as is demonstrated by their inhibition of germination of seed of Trifolium. Furthermore, they also possess antibacterial activity. More specifically, they inhibit the growth of *Diplococcus pneumoniae*. In addition, those compounds in which —NRR' is a hydroxy-substituted cyclic amino group also inhibit the growth of *Chlorella vulgaris*.

Equivalent for the purposes of this invention are the acid-addition salts which the compounds of the present invention form with a variety of organic and inorganic acids. Salts of this type are formed with acids such as sulfuric phosphoric, hydrobromic, hydrochloric, oxalic, citric, maleic, and related acids. They also form quaternary ammonium salts with a variety of organic esters of hydrohalic and aromatic sulfonic acids. Among the esters useful for this purpose are methyl chloride, bromide and iodide, ethyl chloride, propyl chloride, dimethyl sulfate, and ethylene chlorohydrin.

The compounds which constitute this invention and their preparation will appear more fully from a consideration of the following examples, which are given for the purpose of illustration only and are not to be construed as limiting the invention in spirit or scope. In these examples, quantities are given in parts by weight, temperatures in degrees centigrade (° C.), and pressures in millimeters of mercury (mm.).

Example 1

A mixture of 26 parts of 1-piperazineethanol and 12 parts of acrylonitrile is heated at about 110–120° C. for 30 minutes. Low boiling material is distilled from the reaction mixture to leave a residue of crude 4-(2-cyanoethyl)-1-piperazineethanol. 18.5 parts of this crude alcohol, 5 parts of Raney nickel catalyst and 0.5 part of platinum oxide are added to a mixture of 10 parts of liquid ammonia in 200 parts of methanol. The resultant mixture is hydrogenated at room temperature at a pressure of 2–3 atmospheres. When the reduction is complete, the catalyst is removed by filtration and the solvent is removed by distillation at atmospheric pressure. The residue is then distilled at reduced pressure to give 4-(3-aminopropyl)-1-piperazineethanol boiling at about 102–105° C. at 0.01 mm. pressure.

If equivalent quantities of the appropriate starting material are used and the above procedure is repeated, the following compounds are obtained.

2-[N-(3-aminopropyl)ethylamino]ethanol boiling at about 112° C. at 0.6 mm. pressure.
2-[N-(3-aminopropyl)methylamino]ethanol boiling at about 121° C. at 0.2 mm. pressure.
1-(3-aminopropyl)-2-pyrrolidinemethanol.
1-(3-aminopropyl)-3-pyrrolidinol.
1-(3-aminopropyl)-3-piperidinol boiling at about 87–89° C. at 0.01 mm. pressure.
1-(3-aminopropyl)-4-piperidinol boiling at about 95–100° C. at 0.01 mm. pressure.
1-(3-aminopropyl)-4-piperidinemethanol boiling at about 110° C. at 0.03 mm. pressure.
1-(3-aminopropyl)-4-piperidineethanol.
4-(3-aminopropyl)-1-piperazinebutanol.

Example 2

A mixture of 74 parts of 2-[N-(3-aminopropyl)ethyl-amino]ethanol, 12 parts of sulfur dioxide, 125 parts of water, and 25 parts of 5-hydroxyisoquinoline is refluxed for 130 hours. The resultant mixture is cooled and diluted with 200 parts of water. This mixture is extracted with 5 portions of a benzene ether mixture, each portion consisting of 200 parts of a mixture of equal parts by volume of benzene and ether. The combined extracts are washed with diluted sodium hydroxide solution and then with water and dried. The dried mixture is distilled at atmospheric pressure to remove the solvent and distillation is continued under reduced pressure to give 5-{3-[N-(2-hydroxyethyl)ethylamino]propylamino} - isoquinoline distilling at about 200–210° C. at 0.01 mm. pressure.

Oxalic acid is added to an ether solution of the distilled amine to give the corresponding sesquioxalate. This salt is purified by recrystallization from a mixture of methanol and ether. It melts at about 195° C. The free base has the following formula

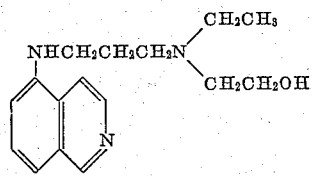

*Example 3*

An equivalent quantity of 2[N-(3-aminopropyl)methylamino]ethanol is substituted for the 2-[N-(3-aminopropyl)ethylamino]ethanol and the procedure of Example 2 is repeated. The crude amine is isolated, dissolved in 2-propanol and mixed with an excess of a solution of hydrogen chloride in 2-propanol. The solid which precipitates is 5-{3-[N-(2-hydroxyethyl)methylamino]propylamino}isoquinoline dihydrochloride melting at about 180° C. The free amine has the following formula

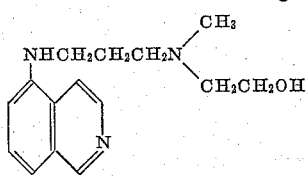

*Example 4*

If an equivalent quantity of 2-[N-(2-aminoethyl)ethylamino]ethanol is substituted for the 2-[N-(3-aminopropyl)ethylamino]ethanol and the procedure of Example 2 is repeated, the product is 5-{2-[N-(2-hydroxyethyl)-ethylamino]ethylamino}isoquinoline.

Likewise, 2-[N-(5-aminopentyl)ethylamino]ethanol reacts with 5-hydroxyisoquinoline to give 5-{5-[N-(2-hydroxyethyl)ethylamino]pentylamino}isoquinoline. This compound has the following formula

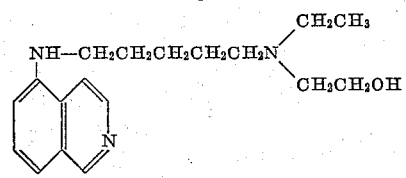

*Example 5*

25 parts of 8-hydroxyisoquinoline, 74 parts of 2-[N-(3-aminopropyl)ethylamino]ethanol, 12 parts of sulfur dioxide, and 125 parts of water are reacted according to the procedure described in Example 2. In this case, the product is 8-{3-[N-(2-hydroxyethyl)ethylamino]propylamino}isoquinoline. This compound has the following formula

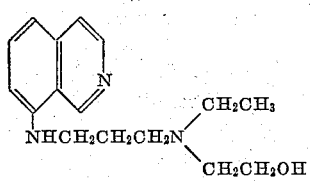

*Example 6*

A mixture of 30 parts of 2-[N-(3-aminopropyl)ethylamino]ethanol and 17 parts of 1-chloroisoquinoline is slowly heated to 180° C. cover a period of 20 minutes. Heating is continued at 180–190° C. for an additional 45 minutes. The resultant mixture is cooled and made slightly alkaline with dilute sodium hydroxide solution. The aqueous mixture is extracted with 5 portions of benzene-ether mixture (equal parts by volume) and the combined extracts are washed with water. The dried solution is distilled first at room temperature to remove the solvent and then at reduced pressure to give 1-{3-[N-(2-hydroxyethyl)ethylamino]propylamino}isoquinoline distilling at about 180° C. at 0.01 mm. pressure. The free amine is dissolved in 2-propanol and mixed with a 2-propanol solution of oxalic acid to give the salt of the above isoquinoline compound with 2 moles of oxalic acid. This dioxalate melts at about 91–93° C. The free amine has the following formula

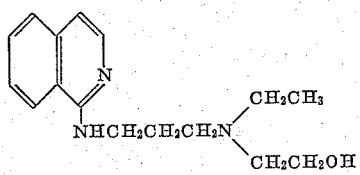

*Example 7*

7 parts of 5-methoxy - 1 - chloroisoquinoline is mixed with 10 parts of 2-[N - (3 - aminopropyl)ethylamino]ethanol and gradually heated to a temperature of 175–180° C. The reaction mixture is maintained at this temperature for about 30 minutes. The product is then isolated from the reaction mixture according to the procedure described in Example 6. The free amine is converted to the oxalate and the crude salt is recrystallized from ethanol to give 1-{3-[N-(2-hydroxyethyl)ethylamino]propylamino} - 5 - methoxyisoquinoline dioxalate melting at about 135° C. The free base of this compound has the following formula

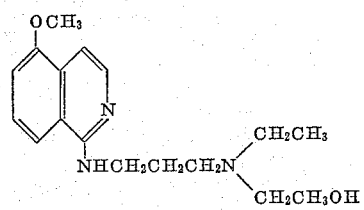

*Example 8*

An equivalent quantity of 1,7-dichloroisoquinoline is substituted for the 5-methoxy-1-chloroisoquinoline and the procedure of Example 7 is repeated. This gives 7-chloro - 1 - {3-[N-(2-hydroxyethyl)ethylamino]propylamino}isoquinoline dioxalate melting at about 117° C. The free base of this compound has the following formula

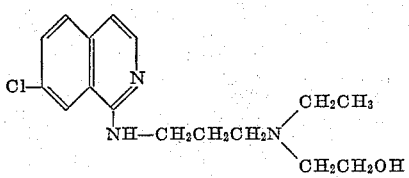

*Example 9*

93 parts of 4-(3-aminopropyl) - 1 - piperazineethanol, 14 parts of sulfur dioxide, 100 parts of water, and 22 parts of 5-hydroxyisoquinoline are mixed and heated at reflux for 90 hours. The reaction mixture is cooled and diluted with 200 parts of water. The mixture is then extracted with 5 portions of chloroform and the combined chloroform extracts are washed with dilute sodium hydroxide solution and then with water. The resultant solution is dried and then distilled to give 5'-{3-[4-(2-hydroxyethyl) - 1 - piperazinyl]propylamino}-isoquinoline boiling at about 210–220° C. at 0.01 mm. pressure. The free amine is dissolved in 2-propanol and converted to the corresponding disulfate by mixing the solution with excess sulfuric acid in 2-propanol. This disulfate melts at about 237–238° C. The free base has the following formula

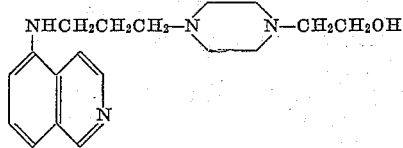

*Example 10*

81 parts of 4-(3-aminopropyl) - 1 - piperazinebutanol, 14 parts of sulfur dioxide, 100 parts of water, and 22 parts of 5-hydroxyisoquinoline are reacted according to the procedure described in Example 9. The product is 5-{3-[4-(4-hydroxybutyl) - 1 - piperazinyl]propylamino}-isoquinoline. This compound has the following formula

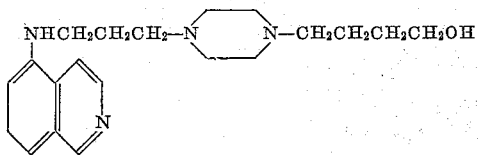

*Example 11*

A mixture of 20 parts of 5-hydroxyisoquinoline, 89 parts of 1-(3-aminopropyl) - 3 - piperidinol, 100 parts of water, and 12 parts of sulfur dioxide is heated slowly to the boiling point and then refluxed for 72 hours. The resultant mixture is cooled and extracted with 5 portions of a benzene-ether mixture (equal parts by volume). The combined extracts are washed first with sodium hydroxide solution and then with water and dried. The solvent is distilled from the solution to give a crystalline residue which is 5-[3 - (3 - hydroxypiperidino)propylamino]isoquinoline melting at about 94-96° C. This compound has the following formula

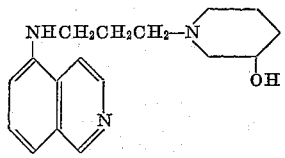

*Example 12*

An equivalent quantity of the appropriate 1-(3-aminopropyl)amine is substituted for the 89 parts of 1-(3-aminopropyl)-3-piperidinol and the procedure of Example 11 is repeated. In this way, 1(3-aminopropyl)-2-hydroxymethylpyrrolidine reacts with 5-hydroxyisoquinoline to give 5-[3-(2-hydroxymethyl - 1 - pyrrolidinyl)propylamino]isoquinoline, 1-(3-aminopropyl) - 4 - (2-hydroxyethyl)piperidine reacts with 5-hydroxyisoquinoline to give 5-{3-[4-(2 - hydroxyethyl)piperidino]propylamino}-isoquinoline, and 4-hydroxymethylpiperidine reacts with 5-hydroxyisoquinoline to give 5-[3-(4-hydroxymethylpiperidino)propylamino]isoquinoline. The last compound has the following formula

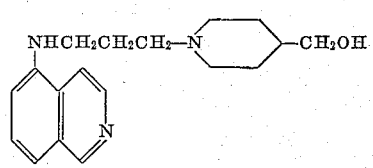

The dihydrochloride of this compound melts at about 252° C.

*Example 13*

If 81 parts of 1-(3-aminopropyl)-3-pyrrolidinol is substituted for the 89 parts of 1-(3-aminopropyl)-3-piperidinol and the procedure of Example 11 is repeated, the product is 5-[3-(3-hydroxy-1-pyrrolidinyl)propylamino]-isoquinoline. This compound has the following formula

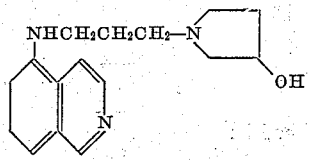

*Example 14*

An equivalent quantity of 1-(3-aminopropyl)-4-piperidinol is substituted for the 1-(3-aminopropyl)-3-piperidinol and the procedure of Example 11 is repeated. The crude free amine obtained is dissolved in 2-propanol and mixed with a solution of hydrogen chloride in 2-propanol to give the dihydrochloride of 5-[3-(4-hydroxypiperidino)propylamino]isoquinoline. This salt melts at about 261–263° C.

*Example 15*

A mixture of 12 parts of 1-chloroisoquinoline and 12 parts of 1-(3-aminopropyl)-4-piperidinol is heated slowly to 135° C. An exothermic reaction ensues and the temperature rises rapidly to about 200° C. The mixture is cooled to about 135–145° C. and maintained at this temperature for 15 minutes. The reaction mixture is then cooled and made slightly alkaline by the addition of dilute sodium hydroxide solution. The aqueous mixture is then extracted with 5 portions of a benzene-ether mixture (equal parts by volume) and the combined extracts are washed with dilute sodium hydroxide solution and then with water. Distillation of the organic solution at atmospheric pressure removes the solvent and then distillation at reduced pressure gives 1-[3-(4-hydroxypiperidino)propylamino]isoquinoline boiling at about 200–210° C. at 0.01 mm. pressure. The free amine is dissolved in 2-propanol and mixed with a solution of hydrogen chloride in 2-propanol to give the corresponding dihydrochloride melting at about 257° C. The free base has the following formula

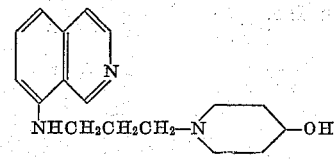

*Example 16*

When an equivalent quantity of 1-(3-aminopropyl)-3-piperidinol is substituted for the 1-(3-aminopropyl)-4-piperidinol, and the procedure of Example 15 is repeated the product is 1-[3-(3-hydroxypiperidino)propylamino]-isoquinoline. In this case, the free amine is obtained as a solid melting at about 137–138° C.

In a similar manner, 1-(3-aminopropyl)-4-piperidinemethanol is reacted with 1-chloroisoquinoline to give 1 - [3 - (4 - hydroxymethylpiperidino)propylamino]isoquinoline as a thick sirupy liquid. The dioxalate of this compound melts at about 156° C. This free base has the following formula

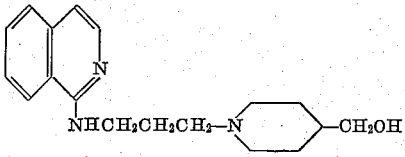

*Example 17*

If an equivalent quantity of 4-(3-aminopropyl)-1-piperazineethanol is substituted for the 1-(aminopropyl)-4- piperidinol and the procedure of Example 15 is repeated, the product obtained is 1-{3-[4-(2-hydroxyethyl)-1-piperazinyl]propylamino}isoquinoline. In this case the product is isolated as the free amine melting at about 92-93° C. This compound has the following formula

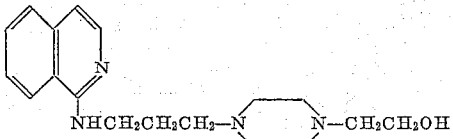

What is claimed is:
1. A compound of the formula

Q—NH—Alk—NRR' wherein Q is selected from the group consisting of isoquinolyl, 5-methoxy-1-isoquinolyl, and 7-chloro-1-isoquinolyl; Alk is lower alkylene containing 2 to 5 carbon atoms; and —NRR' is selected from the group consisting of (lower alkyl)(hydroxy lower alkyl)amino, hydroxy(lower alkyl)piperazinyl,

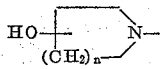

and

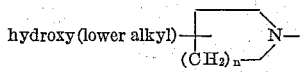

wherein $n$ is a positive integer less than 3.
2. A compound of the formula

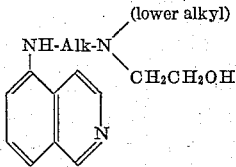

wherein Alk is lower alkylene containing 2 to 5 carbon atoms.

3. 5 - {3 - [N - (2 - hydroxyethyl)ethylamino]propylamino}isoquinoline.

4. A compound of the formula

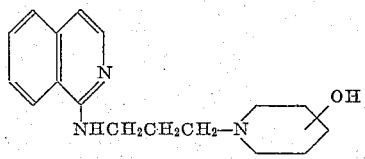

5. 1 - [3 - (3 - hydroxypiperidino)propylamino]isoquinoline.
6. A compound of the formula

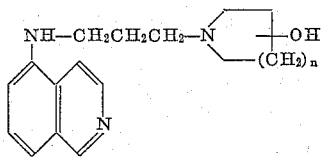

wherein $n$ is a positive integer less than 3.
7. 5 - [3 - (4 - hydroxypiperidino)propylamino]isoquinoline.
8. A compound of the formula

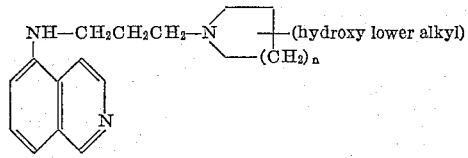

wherein $n$ is a positive integer less than 3.
9. A compound of the formula

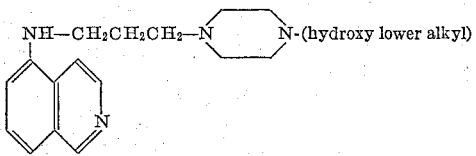

10. 5 - {3 - [4 - (2 - hydroxyethyl) - 1 - piperazinyl]propylamino}isoquinoline.
11. 1 - {3 - [4 - (2 - hydroxyethyl)-1-piperazinyl]propylamino}isoquinoline.
12. 1 - {3 - [N - (2 - hydroxyethyl)ethylamino]propylamino}isoquinoline.

No references cited.